Aug. 23, 1927.

G. R. ELMORE

SWEEP HAYRAKE

Filed Nov. 1, 1921

1,640,031

WITNESSES

Inventor
GREEN R. ELMORE

By Richard B. Owen

Attorney

Patented Aug. 23, 1927.

1,640,031

UNITED STATES PATENT OFFICE.

GREEN R. ELMORE, OF SALINE, MISSOURI.

SWEEP HAYRAKE.

Application filed November 1, 1921. Serial No. 512,149.

This invention relates to sweep hay rakes and has for its principal object to provide a simple construction whereby new teeth can be installed and whereby the teeth may be easily detached therefrom when so desired.

A further object of the invention is to provide a sweep hay rake which is of extremely simple, durable and inexpensive construction, one which is efficient and reliable in operation, and well adapted to the purpose for which it is designed.

With the above and numerous other objects in view, as will appear as the description progresses, the invention resides in certain novel features of construction, and the combination and arrangement of parts as will be hereinafter more fully described and claimed.

Referring to the drawing:—

Figure 1:
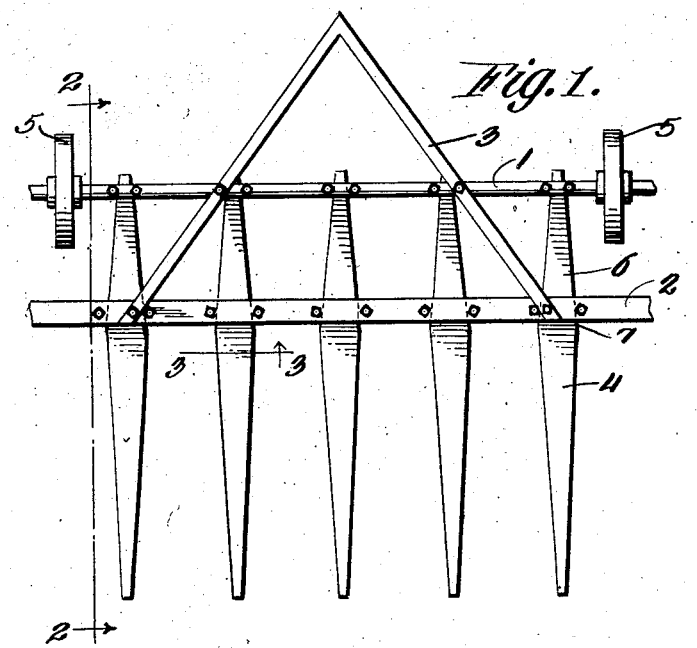
Figure 1 is a fragmentary plan of a sweep hay rake embodying my invention.
Figure 2:
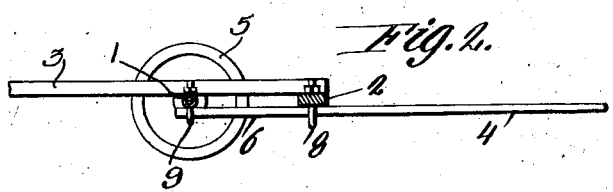
Figure 2 is a transverse section taken on the line 2—2 of Fig. 1.
Figure 3:
Figure 3 is a section taken on the line 3—3 of Figure 1 looking in the direction of the arrow.

Referring to the drawing in detail it will be seen that the rake frame consists of the spaced parallel bars 1 and 2. The bar 1 is constructed preferably of steel pipe and the bar 2 is constructed of wood or some such other suitable material, and these bars are connected by the cross pieces 3 secured to the parallel bars 1 and 2 and converging rearwardly to form a V-shaped adjusting frame. Rotatably mounted on the end portions of the bar 1 are ground wheels 5 adapted to permit convenient movement of the rake frame. The frame may be drawn by draft animals connected with swingle trees carried by the end portions of the bar 2 or, operated by a tractor. The rake teeth are attached to these bars 1 and 2. These teeth consist of the body portion 4 which are straight as illustrated in Figure 1. One end of the body portion 4 of each tooth terminates in a shank 6 which extends across the bars 1 and 2. The side edges of the body 4 diverge toward the shank 6 while the side edges of the shank 6 diverge from each other toward the body 4 and thus form an enlarged portion 7. The U-bolts 8 engage the enlarged portion of the teeth on the side adjacent the bodies 4 while the U-bolts 9 engage the smaller end of the shanks 6. The U-bolts 8 are passed through the bar 2 while the U-bolts 9 pass through the bar 1. The U-bolts 8 and 9 prevent the teeth from being pulled toward the rear of the frame. From this construction it will be seen there will be no necessity for inserting bolts or nails through the teeth. This construction will aid in the assembling and disassembling of the device when it is moved from one field to another and may be stored away in a comparatively small space.

Having thus described my invention what I claim as new is:—

In a rake of the character described including a pair of connected spaced rake bars each carrying a depending U bolt arranged in alignment with one another, a tooth designed to extend longitudinally of the rake beneath and transversely of the bars having its intermediate portion enlarged immediately forwardly of the bolt of the forward bar, the rear portion of the tooth converging toward the rear end thereof and having slidable engagement with and through the bolt in the rear bar, said enlarged intermediate portion being of greater width than the adjacent supporting bolt to prevent the tooth from passing rearwardly therethrough and the forward portion of the tooth converging forwardly, substantially for the purpose described.

In testimony whereof I affix my signature.

GREEN R. ELMORE.